United States Patent [19]

Derendinger

[11] Patent Number: 4,550,680
[45] Date of Patent: Nov. 5, 1985

[54] APPARATUS FOR APPLYING A LAYER OF POWDER TO A SURFACE

[75] Inventor: Max Derendinger, Zurich, Switzerland

[73] Assignee: RCA Corporation, Princeton, N.J.

[21] Appl. No.: 672,957

[22] Filed: Nov. 19, 1984

[51] Int. Cl.⁴ .......................... B05D 7/00; B05D 5/00
[52] U.S. Cl. ...................................... 118/308; 427/180
[58] Field of Search ................. 118/25, 308; 427/180, 427/195

[56] References Cited

U.S. PATENT DOCUMENTS

| | | | |
|---|---|---|---|
| 1,986,047 | 1/1935 | Dawley et al. | 118/308 |
| 2,943,599 | 7/1960 | Heck | 118/308 |
| 2,952,391 | 9/1960 | Garland | 222/162 |
| 3,534,787 | 10/1970 | Heck | 141/131 |
| 3,908,591 | 9/1975 | Hall | 118/308 |
| 3,978,250 | 8/1976 | Greten | 427/201 |

Primary Examiner—Shrive P. Beck
Attorney, Agent, or Firm—Birgit E. Morris; Donald S. Cohen; James M. Trygg

[57] ABSTRACT

An apparatus is shown for applying a homogeneous uniform layer of a powder to a surface of a part. The apparatus utilizes two belts which are made to track about two pairs of rollers in unison. A hopper containing the powder having an opening in the bottom is disposed so that the opening is closed off by one or both of the belts except for a slit aperture. The aperture is formed by a space between abutting ends of the two belt-roller assemblies. The apparatus is arranged so that as the belts track about the rollers the aperture traverses the opening in the hopper thereby permitting powder to pass through the aperture and fall to the part to be coated which is positioned directly below the opening.

10 Claims, 13 Drawing Figures

APPARATUS FOR APPLYING A LAYER OF POWDER TO A SURFACE

This invention relates to apparatus for applying a layer of a powder to a surface of a part.

BACKGROUND OF THE INVENTION

In the application of a powder to the surface of a part, the part is usually arranged on a conveyor belt which moves the part under the discharge area of the applying apparatus. A quantity of powder to be applied is stored in a hopper. A second conveyor is then utilized to transfer a measured amount of the powder from the hopper to the discharge area where it is permitted to fall to the surface of the part. There afe several known devices for accomplishing this.

One such prior art device includes a rotating cylinder, or drum, having an outer surface which engages an opening in the bottom of a hopper. The outer surface effectively blocks the opening thereby serving as a bottom to the hopper. A space is provided between one edge of the hopper wall adjacent the opening and the surface of the rotating drum. As the drum rotates, powder in the bottom of the hopper is carried along with the surface of the drum, under the spaced edge. As the drum continues to turn, the powder eventually falls off the drum to a part below. For a more complete description of this type of structure see U.S. Pat. No. 3,534,787 which issued Oct. 20, 1970 to Heck.

A second such prior art device utilizes a somewhat horizontally disposed conveyor belt to pick up powder contained in the bottom of the hopper in a manner similar to that of the drum described above. A space is provided between an edge of the hopper and the conveyor belt so that particles of powder may be picked up from the hopper and carried along the surface of the belt. The belt is a continuous web carried by a pair of rollers at opposite ends, one being a drive roller and the other an idler roller. As the powder particles reach the end of the conveyor belt they fall onto the surface of a part which is arranged on another conveyor belt vertically below. For a more complete description of this type of structure see U.S. Pat. No. 2,943,599 which issued July 5, 1960 to Heck.

A third such prior art device utilizes a combination of several conveyor belts, mechanical agitators, and blowers to move powder particles from a hopper to the surface of a moving belt. An example of this type of apparatus is disclosed in U.S. Pat. No. 3,978,250 which issued Aug. 31, 1976 to Griten.

All of these prior art devices apply the powder in a continuous, uninterruped stream having a constant width. This results in the undesirable and wasteful application of powder to the conveyor belt that is transporting the parts. Where the parts are rectangular in shape this waste can be reduced by limiting the width of the discharge area to that of the surface to be coated and closely spacing the parts on the conveyor. Where the parts are other than rectangular in shape there is necessarily a greater area of exposed conveyor belt resulting in additional waste. What is desired is to apply the powder evenly to the surface of a part while substantially reducing the amount of powder applied to areas adjacent the part. The present invention achieves this by the novel use of a moving, variable width aperture structure described herein.

SUMMARY OF THE INVENTION

According to the present invention there is shown an apparatus for distributing a layer of powder over a surface of a part having a predefined shape. Support means is provided for holding the part so that the surface is facing upwardly. A container means is disposed above the surface for holding a quantity of the powder. The container means has an opening facing downwardly that is defined by a peripheral edge having a shape related to the predefined shape of the part. A closure means interacts with the edge of the opening so that the opneing is either completely closed or is open only through an aperture. The aperture is selectively movable to traverse both the opening and the surface of the part.

DESCRIPTION OF THE PREFERRED EMBODIMENT

FIGS. 1 through 4 show an applicator 10 having a hopper 12 attached to a rigid support frame 14 and a part holder 16 also attached to the support from directly below the hopper 12.

Figure 6:
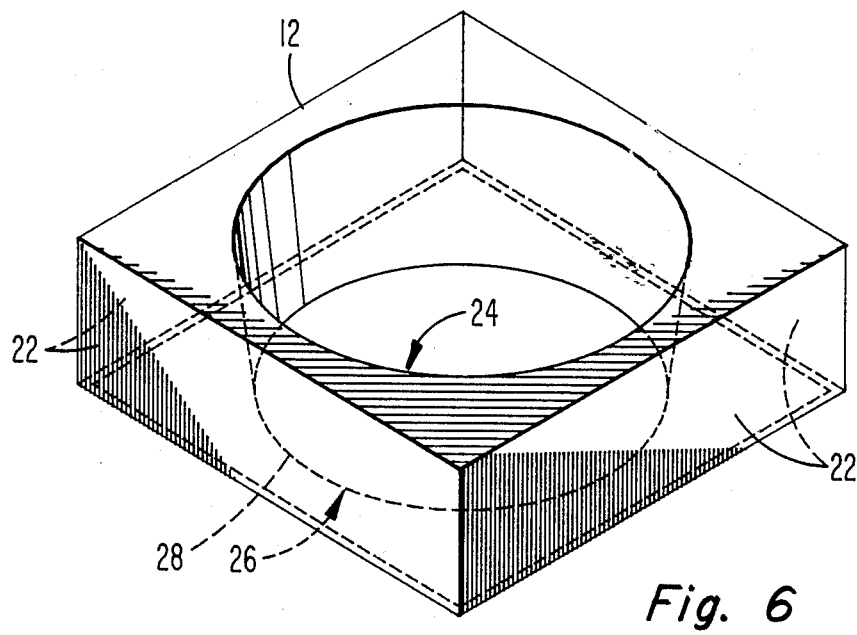
FIG. 6 is an orthogonal view of the hopper shown in FIG. 1.
Figure 7:
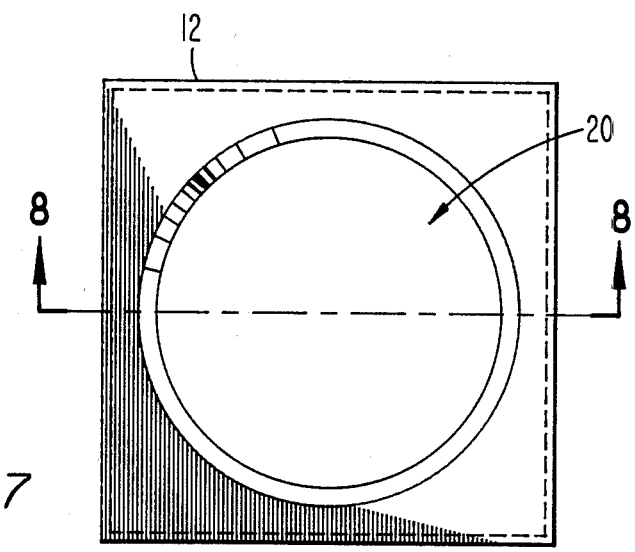
FIG. 7 is a top view of the hopper shown in FIG. 6.
Figure 8:
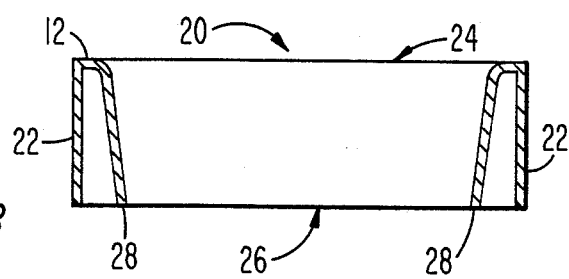
FIG. 8 is a sectional view taken along the lines 8—8 of FIG. 7.

The hopper 12, as best seen in FIGS. 6, 7, and 8, includes a container portion 20, for holding powder, supported by four side walls 22. The container portion 20 has an opening 24 facing upwardly and an opening 26 facing downwardly, as viewed in FIG. 8. The opening 26, is defined by a peripheral edge 28 which is substantially flat for its entire circumference. The shape of the opening 26, in the present case, is substantially circular. However, the shape may vary for reasons that will be set forth below.

As shown in FIGS. 1 thru 4 a pair of continuous webs or belts 40 and 42 are disposed about two pairs of parallel rollers 44, 45 and 46, 47 respectfully. The rollers 44 through 47 are journaled for rotation in a rigid carriage 48 which may be of any suitable structure known in the art. The carriage 48, as best seen in FIG. 5, comprises left and right hand members 102 and 103 each being a mirror image of the other. The left member 102 includes two parallel disposed rails 106 and 108 which are rigidly interconnected by two structural members 110. Each of the rails 106 and 108 has a turned down end 112 containing a through threaded hole 114, the axis of which is approximately parallel to the rail. A pair of commercially available slides 118 are arranged so that the movable member 120 of one is attached to the rail 106 and the movable member 120 of the other is attached to the rail 108. The stationary members 122 of the slides 118 are attached to the support frame 14 in the position shown in FIG. 1. The slides 118 are arranged so that the member 102 may undergo horizontal movement as viewed in FIG. 2. Two pairs of holes 126 and 128 are provided in the rails 106 and 108 for journalling the rollers 44 and 45.

The right hand member 103 is similar to the left hand member 102 and includes two parallel rails 106 and 108 rigidly interconnected by two structural members 110. Each rail 106 and 108 has a turned down end 112 facing the corresponding turned down end 112 of the left hand member 102 as shown in FIG. 5. The end 112 has a through threaded hole 132 in alignment with the threaded hole 114 but of opposite hand threads. Similar to the member 102, two pairs of holes 126 and 128 are provided in the rails 106 and 108 for journalling the rollers 46 and 47. The member 103 is movably attached to the support frame 14 by a pair of slides 118 in a manner similar to that of the member 102. A pair of studs 136 having right hand threads on one end and left hand threads on the other end are arranged in threaded engagement with the threaded holes 114 and 132 as shown in FIG. 5. By selectively turning these two studs 136, the right and left hand members 102 and 103 will be made to be closer together or further apart for a purpose that will be described below.

Figure 1:
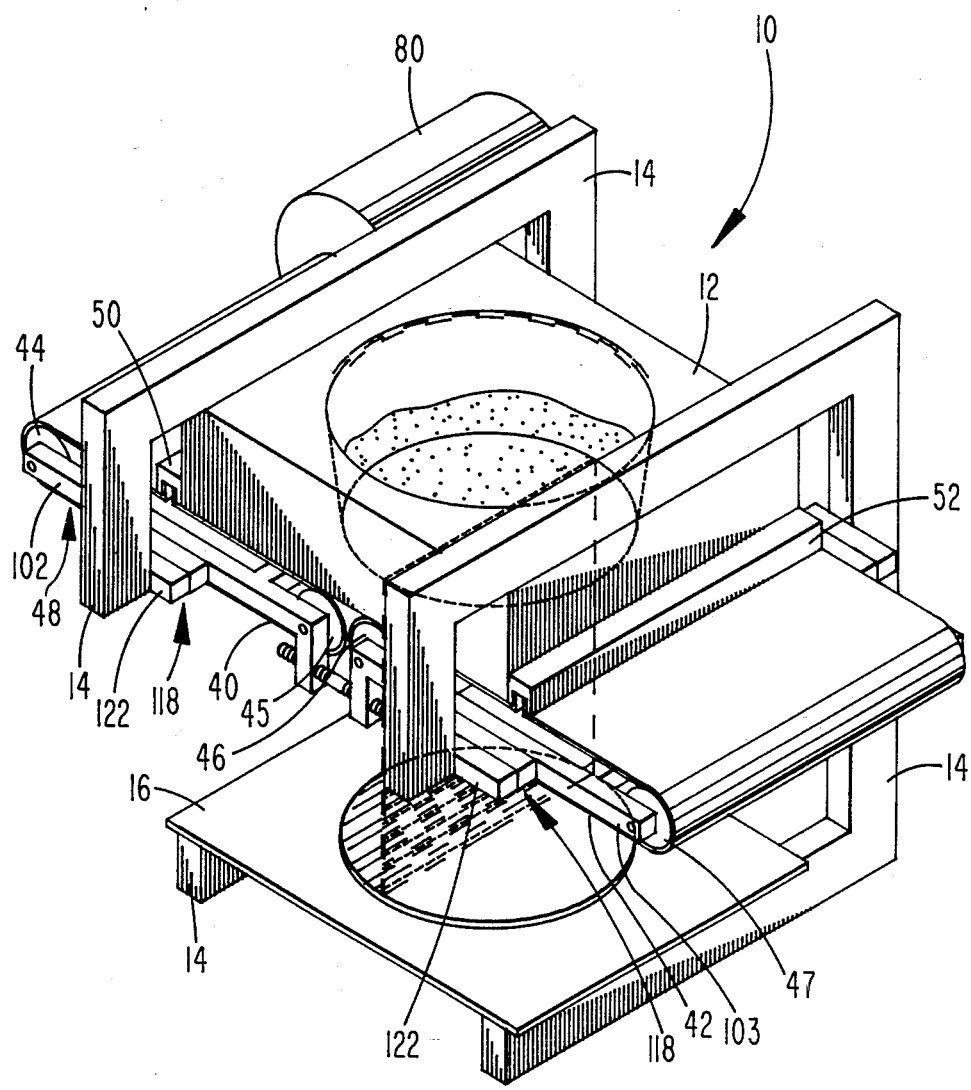
FIG. 1 is an orthogonal view of apparatus for applying a layer of a powder illustrating the teachings of the present invention.
Figure 2:
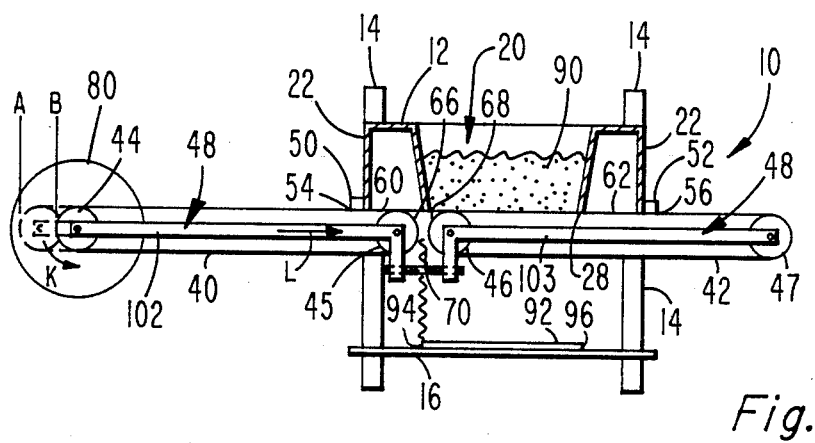
FIG. 2 is a partial sectional view of the apparatus shown in FIG. 1 wherein the apparatus is beginning to apply a layer of powder to a part.
Figure 3:
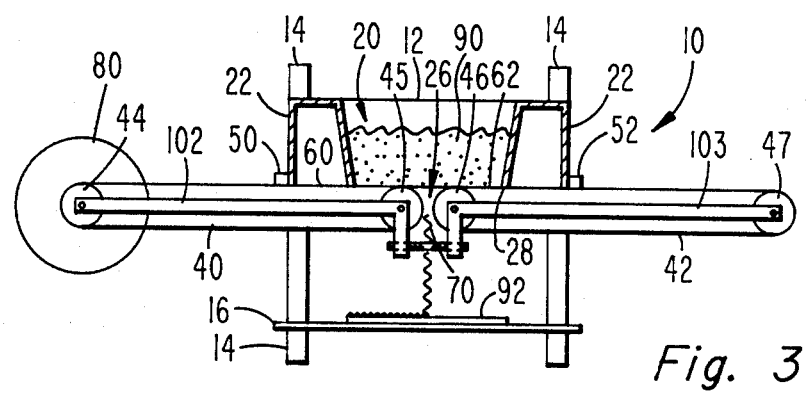
FIG. 3 is a view similar to that of FIG. 2 wherein the application of powder is partially completed.
Figure 4:
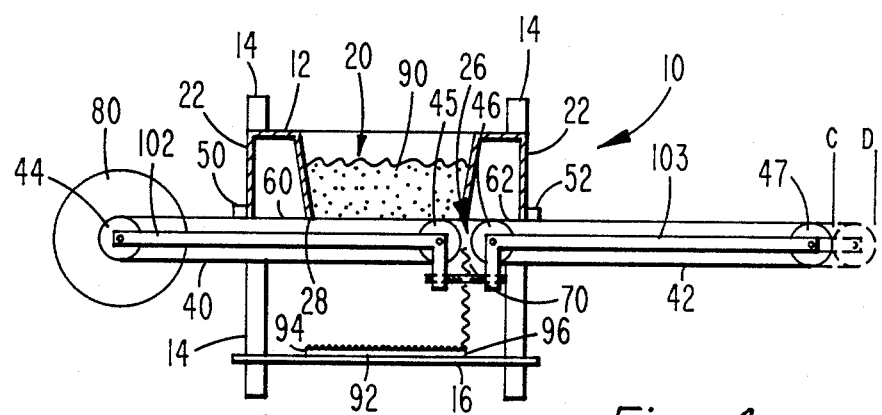
FIG. 4 is a view similar to that of FIG. 3 wherein the application of powder is completed.
Figure 5:
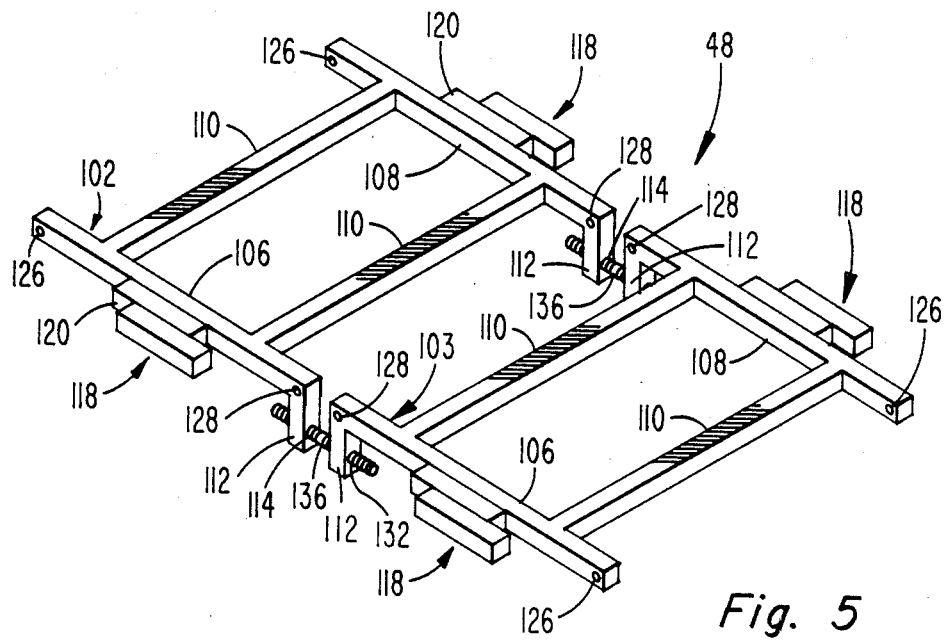
FIG. 5 is an orthogonal view of the carriage shown in FIG. 1.

The right and left hand members 102 and 103 of the carriage 48, when coupled together by the two studs 136 are arranged to move back and forth freely in the horizontal plane as viewed in FIGS. 2, 3, and 4. The limits of movement of the complete assembly of the carriage 48, rollers 44–47 and belts 40 and 42 are indicated by A in FIG. 2 and D in FIG. 4.

A pair of elongated brackets 50 and 52 are attached to the upper portions 54 and 56 of the belts 40 and 42 respectively and are arranged so that their longitudinal axes are substantially parallel to the longitudinal axes of the rollers 44 through 47. The two brackets 50, 52 are attached to two opposite walls 22 of the hopper 12 so that the peripheral edge 28 of the hopper is in contact with either a portion 60 of the upper surface of the belt 40, a portion 62 of the uper surface of the belt 42, or both portions 60 and 62. The spacings between the two rollers 44 and 45 and between the two rollers 46 and 47 are arranged so that the portions 60 and 62 of the upper surfaces of the belts 40 and 42 are taut and thereby maintained in contact with the edge 28. A closure of the opening 26 of the container portion 20 is effected when the entire peripheral edge 28 is in contact with only the portion 60 or 62. This occurs when the roller 44 is in the position indicated at A in FIG. 2, and when the roller 47 is in the position indicated at D in FIG. 4. The outer surfaces 66 and 68 of the rollers 45 and 46 respective are spaced apart an amount slightly greater than the thicknesses of the two belts 40 and 42 and the particle size of the powder to be used thereby forming an elongates slot, or aperture 70 through which powder may pass.

By selectively turning the two studs 136, as described above, the spacing between the rollers 45 amd 46 may be adjusted so that the aperture 70 will pass a greater or lesser amount of powder. This permits control of the thickness of the layer of powder that is being applied to the part. Additionally, this adjustment of the two studs 136 permits accommodation of powders having different grain sizes thereby assuring versatility in the kinds of powders that may be applied with the applicator 10.

A drive motor 80 is attached to the frame 48 and is arranged to selectively rotate the roller 44 in either a clockwise or counterclockwise direction. With the roller 44 in the position indicated by A in FIG. 2, the entire peripheral edge 28 will be in contact with the portion 62 of the belt 42, and the opening 26 will be completely closed. When the drive motor 80 is made to rotate the roller 44 counterclockwise, when starting from this position, the belt 40 will track around the pair of rollers 44 and 45 in a counterclockwise direction indicated by the arrow K in FIG. 2. Since the bracket 50 is fixed to both the wall 22 of the hopper 12 and the upper portion 54 of the belt 40, the frame 48 along with the rollers 44 through 47 will be required to move in the direction indicated by the arrow L. The belt 42, having its upper portion 56 attached to the bracket 52 which, in turn, is attached to the opposite wall 22 of the hopper 12, is required to track about the rollers 46 and 47, also in a counterclockwise direction. Such movement of the frame 48, rollers 44 through 47, and belts 40 and 42 may continue until the roller 47 has reached the limiting position indicated at D in FIG. 4. In this case, it will be understood, that the aperture 70 has completely traversed the opening 26 from left to right as viewed in FIGS. 2, 3 and 4. Similarly, by causing the drive motor 80 to rotate the roller 44 in a clockwise direction, the aperture 70 is made to traverse the opening 26 from right to left as viewed in FIGS. 2,3, and 4.

In operation, the frame 48 is moved to the left, as viewed in FIG. 2, until the roller 44 is in the position indicated at A and a quantity of powder 90 is placed into the container 20 of the hopper 12. The portion 60 of the upper surface of the belt 40 covers the entire opening 26 thereby confining the powder 90 to the container 20. A part 92, to be coated, is placed on the part holder 16 as shown in FIG. 2. The motor 80 is energized so that the roller 44 begins to rotate counterclockwise thereby causing the two belts 40 and 42 to track about their respective roller pairs as indicated by the arrow K in FIG. 2. As the roller 44 reaches the position indicated by B in FIG. 2 the aperture 70 will begin to expose the opening 26 thereby permitting powder to pass through and fall to the left most edge 94 of the part 92. As the carriage 48 continues to move to the right, as viewed in FIGS. 3 and 4, the aperture 70 will traverse the entire opening 26 from left to right depositing powder on the part 92. When the roller 47 reaches the position indicated by C in FIG. 4, the powder falling through the aperture 70 will reach the right most edge 96. When the roller 47 reaches the position indicated by D in FIG. 4, the opening 26 will be completely closed by the portion 60 of the belt 40.

Figure 12:
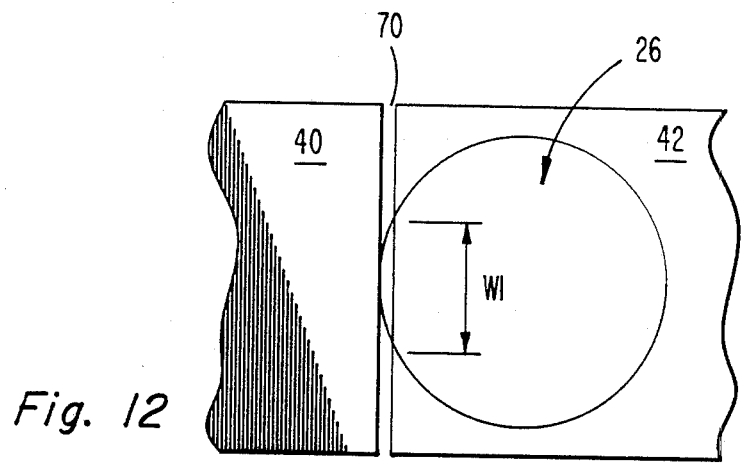
FIG. 12 is a schematic view showing the relationship between the aperture and the opening in the hopper.
Figure 13:
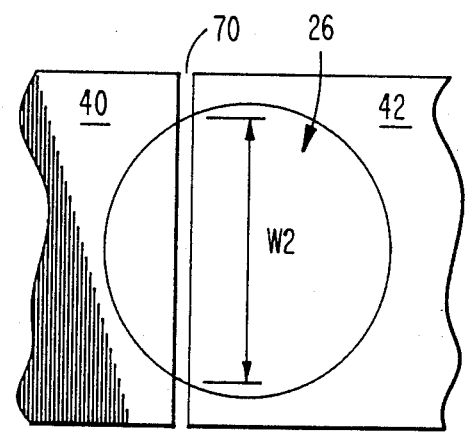
FIG. 13 is a schematic view similar to that of FIG. 12.

FIGS. 12 and 13 depict schematically the interrelationship of the aperture 70 and the circular opening 26. As the aperture 70 begins to expose the opening 26, see FIG. 12, the effective opening through which powder may pass has a length W1. As the aperture 70 traverses the opening 26 to the position shown in FIG. 13, it is seen that the effective opening now has a length W2. By selecting the size and shape of the opening 26, the corresponding size and shape of the applied layer of powder may be accurately controlled. Importantly, in this way, parts having complex shapes can be coated without the wasteful application of powder to areas adjacent the parts. It should be noted that the opening 26 should be in substantial registry with the part 92 so that the length of the effective opening of the aperture 70 corresponds to the respective width of the part 92 for every position of the aperture 70 as the aperture traverses the opening 26 and part 92.

A very important aspect of the present invention, inherent in the novel structure which controls movement of the aperture 70, is that there is no relative movement in the horizontal plane between the particles of powder and the surfaces of the portions 60 and 62 of the belts 40 and 42 respectively. This effectively eliminates lateral shifting of the powder 90 contained in the container 20 that would otherwise occur if the portions 60 and 62 were to slide along the edge 28 of the opening 26. This lateral shifting of the powder, of course, would be caused by friction between the particles of powder and the surfaces of the portions 60 and 62 of the belts. Such a lateral shifting would cause uneven distribution of powder within the container 20 and could affect the uniformity of the layer applied to the part 92.

Figure 9:
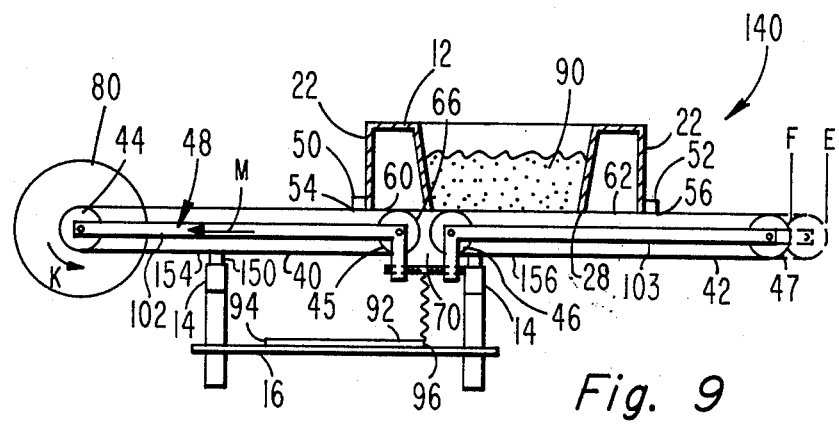
FIG. 9 is a view similar to that of FIG. 2 showing a second embodiment of the present invention.
Figure 10:
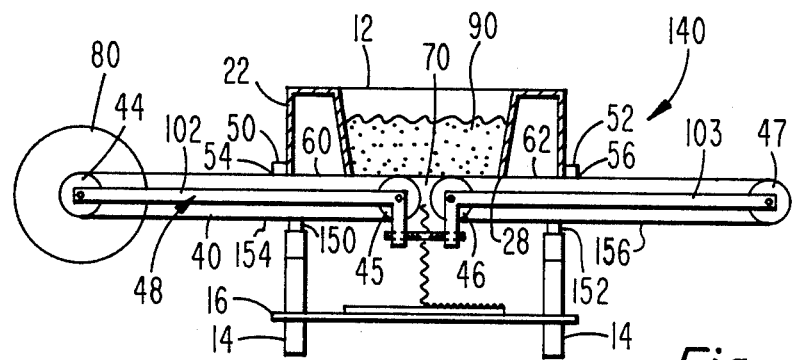
FIG. 10 is a view similar to that of FIG. 3 showing the second embodiment of the present invention.
Figure 11:
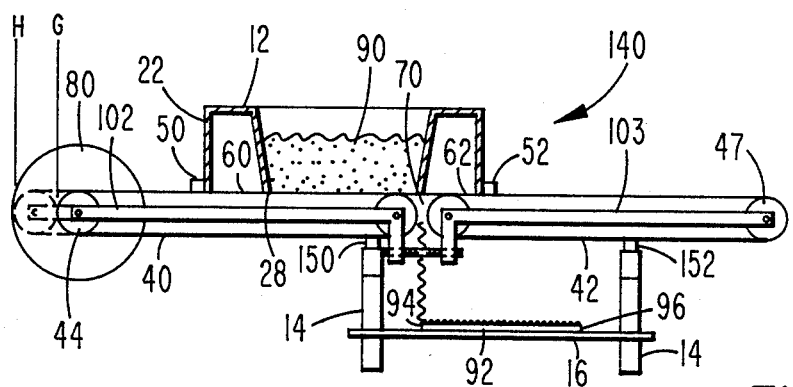
FIG. 11 is a view similar to that of FIG. 4 showing the second embodiment of the present invention.

A second embodiment of the present invention, applicator 140, is shown in FIGS. 9, 10, and 11. All parts that are similar to those shown in FIGS. 2, 3, and 4 have identical identification numbers. The significant difference between the structures of the first and second embodiments is that the hopper 12 in the applicator 10 is rigidly attached to the support frame 14 while in the applicator 140 it is free to move back and forth in a horizontal plane as shown in FIGS. 9, 10, and 11. A second pair of elongated brackets 150 and 152 are attached to the lower portions 154 and 156 of the belts 40 and 42 respectively in the applicator 140. The two brackets 150 and 152 are attached to the support frame 14 as shown, thereby anchoring the belts 40 and 42 at those points. As with the applicator 10, the carriage 48 of the applicator 140 is arranged to slide back and forth horizontally, as viewed in FIGS. 9, 10, and 11, by virtue of two pairs of slides that are not shown.

The operation of the applicator 140 is similar to that of the applicator 10 in that the drive motor 80 causes the roller 44 to rotate counterclockwise thereby causing the two belts 40 and 42 to track about their respective roller pairs as indicated by the arrow K in FIG. 9. As the roller 44 continues to rotate the carriage 48 will move in the direction indicated by the arrow M in FIG. 9, thereby causing the aperture 70 to traverse the part 92 from right to left. The elongated brackets 50 and 52 are attached to the upper portions 54 and 56 of the belts 40 and 42 respectively, as with the applicator 10. This causes the hopper 12 to move along with the upper portions 54 and 56 of the belts in the direction indicated by the arrow M in FIG. 9.

As is shown in FIGS. 9, 10, and 11, the carriage 48 traverses right to left from a starting position indicated by E in FIG. 9 to a final position indicated by H in FIG. 11, E and H being analogous to A and D of FIGS. 2 and 4 respectively. As the roller 47 reaches the position indicated by F, the aperture 70 will begin to expose the opening 26 thereby permitting powder to pass through and fall to the right most edge 96 of the part 92. As the carriage 48 continues to move to the left, as viewed in FIGS. 10 and 11, the aperture 70 will traverse the part 92 and the entire opening 26 but in opposite directions. That is, the aperture 70 traverses the part 92 from right to left and traverses the opening 26 from left to right. When the roller 44 reaches the position indicated by G in FIG. 11, the powder falling through the aperture 70 will reach the left most edge 94. When the roller 44 reaches the position indicated by H in FIG. 11 the opening 26 will be completely closed by the portion 60 of the belt 40. It will be noted that, similar to the applicator 10, the length of the effective opening of the aperture 70 corresponds to the respective width of the part 92 for every position of the aperture 70 as the aperture traverses the opening 26 in one direction and the part 92 in the opposite direction. As will be appreciated by those skilled in the art, this relative movement of the aperture 70 with respect to the part 92 and the opening 26 necessitates that the shape of the opening 26 be similar to that of the part 92 but reversed in the direction of motion in the horizontal plane. This is made obvious by noting that the powder being deposited on the right most edge 96 of the part 90 passes through the aperture 70 when the aperture is near the left most edge of the opening 26 as viewed in FIG. 9.

I claim:

1. An apparatus for distributing a layer of powder over a surface of a part having a predefined shape comprising:
   (a) support means for holding said part so that said surface is facing upwardly;
   (b) container means disposed above said surface for holding a quantity of said powder, said container means having an opening facing downwardly and being defined by a peripheral edge having a shape related to said predefined shape of said part; and
   (c) closure means for interacting with said edge of said opening so that said opening is either completely closed or said opening is open only through an aperture that is selectively movable to traverse both said opening and said surface of said part.

2. The apparatus set forth in claim 1 wherein said closure means comprises a first surface and a second surface which are substantially coplanar and spaced to form said aperture therebetween, a portion of one of said first and second surfaces being either in contact with a portion of said peripheral edge or not in said contact therewith, said portion arranged so that when in said contact said portion is stationary with respect to said peripheral edge.

3. The apparatus set forth in claim 2 wherein said first and second surfaces are portions of a continuous first web and a continuous second web respectively each of which is arranged to move about a different plurality of spaced rollers which are journaled for rotation.

4. The apparatus set forth in claim 3 wherein one of said first or second surfaces has a region that is held immovable with respect to said container means.

5. The apparatus set forth in claim 4 including a drive means for causing said aperture to traverse both said opening of said container means and said surface of said part.

6. The apparatus set forth in claim 5 wherein said drive means is a motor arranged to rotate one of said plurality of spaced rollers.

7. The apparatus set forth in claim 6 wherein said opening of said container means is of substantially identical shape to said predetermined shape of said surface of said part.

8. The apparatus set forth in claim 7 including means for selectively adjusting said space between said first and second surfaces of said closure means.

9. The apparatus set forth in claim 8 wherein said container means is held immovable with respect to said support means.

10. The apparatus set forth in claim 8 wherein a portion of one of said first web or said second web other than said first surface and said second surface is held immovable with respect to said support means.

* * * * *